US008872971B2

(12) United States Patent
Numano

(10) Patent No.: US 8,872,971 B2
(45) Date of Patent: Oct. 28, 2014

(54) VIDEO DISPLAY APPARATUS, VIDEO PROCESSING METHOD, AND VIDEO DISPLAY SYSTEM

(75) Inventor: Fujihito Numano, Toshima-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 13/358,993

(22) Filed: Jan. 26, 2012

(65) Prior Publication Data

US 2012/0229594 A1   Sep. 13, 2012

(30) Foreign Application Priority Data

Mar. 9, 2011   (JP) ................................. 2011-051928

(51) Int. Cl.
*H04N 7/00*   (2011.01)

(52) U.S. Cl.
USPC .......................................................... 348/552

(58) Field of Classification Search
USPC .................................... 348/222.1, 231.6, 552
See application file for complete search history.

(56) References Cited

U.S. PATENT DOCUMENTS

| 5,311,301 | A | | 5/1994 | Jae-Gyun |
| 5,568,192 | A | * | 10/1996 | Hannah ........................ 348/222.1 |
| 5,625,350 | A | * | 4/1997 | Fukatsu et al. ................ 340/4.41 |
| 6,005,613 | A | * | 12/1999 | Endsley et al. ............. 348/231.6 |
| 7,150,032 | B1 | * | 12/2006 | Sadanaka et al. ................ 725/80 |
| 7,636,394 | B2 | * | 12/2009 | Ishii et al. ................. 375/240.26 |
| 2002/0095689 | A1 | | 7/2002 | Novak |
| 2008/0267584 | A1 | * | 10/2008 | Green .............................. 386/95 |
| 2008/0291326 | A1 | | 11/2008 | Shishido et al. |
| 2010/0073455 | A1 | | 3/2010 | Iwabuchi et al. |
| 2011/0052142 | A1 | | 3/2011 | Sultenfuss et al. |

FOREIGN PATENT DOCUMENTS

| JP | H04-117784 | 4/1992 |
| JP | 06-086298 | 3/1994 |
| JP | 2006-074521 | 3/2006 |
| WO | WO 02/30105 | 4/2002 |

OTHER PUBLICATIONS

Japanese Decision to Grant a Patent for Japanese Application No. 2011-051928, mailed on May 8, 2012, in 4 pages.
Extended European Search Report for Application No./Patent No. 12150681.0-2202/2498506, dated Sep. 26, 2012, in 9 pages.

* cited by examiner

*Primary Examiner* — Mohammad Islam
(74) *Attorney, Agent, or Firm* — Knobbe, Martens, Olson & Bear LLP

(57) ABSTRACT

According to one embodiment, a video display apparatus includes: a broadcast data input module; a data input module; a restricting module; and a video processor. The broadcast data input module inputs broadcast contents including first video data. The data input module inputs information including the second video data from an information processor connected via a network. The information complies with a standard different from that of the broadcast contents. The restricting module sets a value related to an item so as to restrict reproduction of the first video data. The video processor restricts, when a value of the item of the first video data input from the broadcast data input module deviates from the value set by the restricting module while the data input module is inactive, reproduction of the first video data, and disables, when the data input module is active, the restriction restricted by the restricting module.

9 Claims, 6 Drawing Sheets

VIDEO DISPLAY APPARATUS, VIDEO PROCESSING METHOD, AND VIDEO DISPLAY SYSTEM

CROSS-REFERENCE TO RELATED APPLICATIONS

This application is based upon and claims the benefit of priority from Japanese Patent Application No. 2011-051928, filed Mar. 9, 2011, the entire contents of which are incorporated herein by reference.

FIELD

Embodiments described herein relate generally to a video display apparatus, a video processing method, and a video display system.

BACKGROUND

Conventionally, there is proposed various applications for making/receiving calls among communication devices connected with each other via a network, as the network technology is advanced.

Further, digital devices become more and more sophisticated as the performance of processors is improved and the software technology is developed. Accordingly, various functions are begun to be installed in digital television display devices. As a result, the digital television display devices have become capable of, for example, obtaining television program information from a communication device connected via a network.

For the digital television display devices, there is proposed an Internet protocol (IP) phone function for making calls to or receiving calls from a communication device connected thereto via a network.

The digital television display devices receives terrestrial colorcast complying with the National Television System Committee (NTSC) standard, the Phase Alternation by Line (PAL) standard, or the like. The NTSC standard is used in for example Japan or America, and has the frame rate of 30 frames per second (fps). The PAL standard is used in for example China or European countries such as Germany, England, and Netherlands, and has the frame rate of 25 fps.

Conventionally, the broadcast waves of different frame rates, such as that of the NTSC standard and the PAL standard, could all be reproduced in a same device, thereby causing various negative impact. Therefore, the reproduction of the contents is made disabled if the frame rate (in fps) of the received broadcast waves deviates from a specified frame rate.

On the other hand, as far as the IP phone function is concerned, there should not be restriction on the frame rate because a frame rate for the IP phone function is made selectable from a certain range (e.g., from 5 fps, 10 fps, 15 fps, 20 fps, 25 fps, and 30 fps) according to the machine performance.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a video display apparatus comprises: a broadcast data input module; a data input module; a restricting module; and a video processor. The broadcast data input module is configured to input broadcast contents comprising first video data. The data input module is configured to receive information comprising the second video data from an information processor connected via a network. Here, the information complies with a standard different from that of the broadcast contents. The restricting module is configured to preliminarily set a specified value related to a predetermined item so as to restrict reproduction of the first video data. The video processor is configured to restrict, when a value of the predetermined item of the first video data input from the broadcast data input module deviates from the specified value set by the restricting module while the data input module is inactive, reproduction of the first video data, and is configured to disable, when the data input module is active, the restriction restricted by the restricting module.

Figure 1:
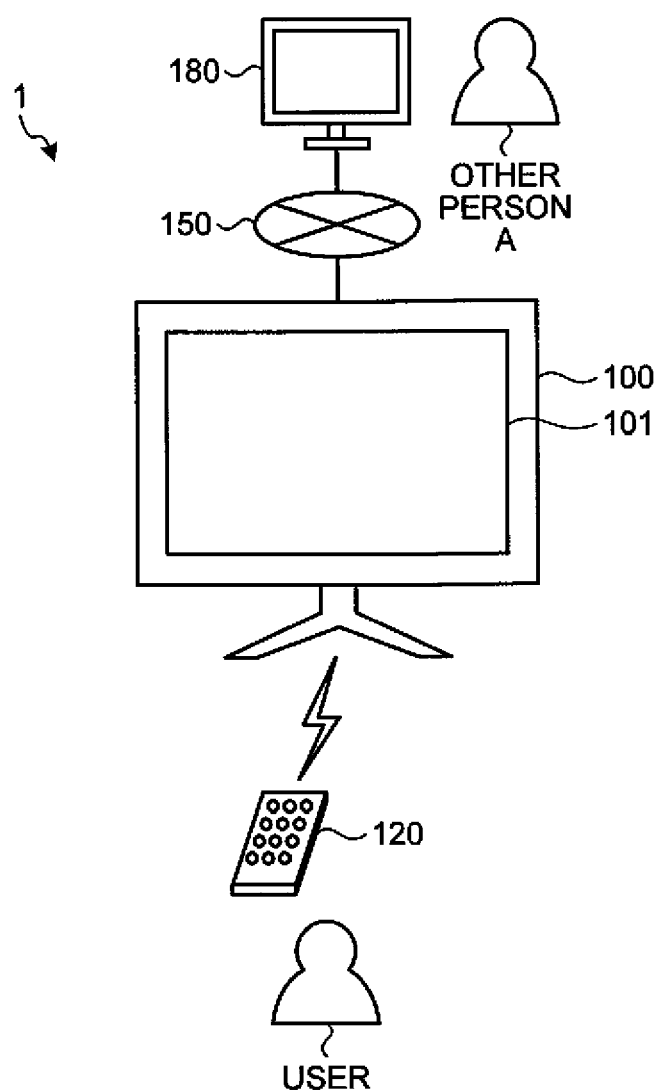
FIG. 1 is an exemplary diagram illustrating an environment for using a digital television receiver according to an embodiment.

Exemplary embodiments are described below with reference to the accompanying drawings. FIG. 1 is a diagram illustrating an environment for using a digital television receiver as a video display apparatus 100 according to the embodiment. As illustrated in FIG. 1, as a digital television receiver, the video display apparatus 100 according to the embodiment displays the received program contents on a display screen 101. The video display apparatus 100 is connected to a communication device 180 such as a personal computer or a digital television serving as an information processor, via a network 150 such as the Internet communication line. The video display apparatus 100 and the communication device 180 constitute a video display system 1.

The video display apparatus 100 makes calls to or receives calls from a communication device connected to the network 150 using a videophone. This enables the video display apparatus 100 to communicate with the communication device 180 using a videophone. Meanwhile, a remote controller 120 used to select programs may be used to pickup calls or to hang up calls.

In order to make such communication possible, the video display apparatus 100 is assigned with an ID to be referred to at the time of the communication. Accordingly, at the time of making a call to or at the time of receiving a call from the video display apparatus 100, the communication device 180 can select that ID as the other end of the call.

Figure 2:
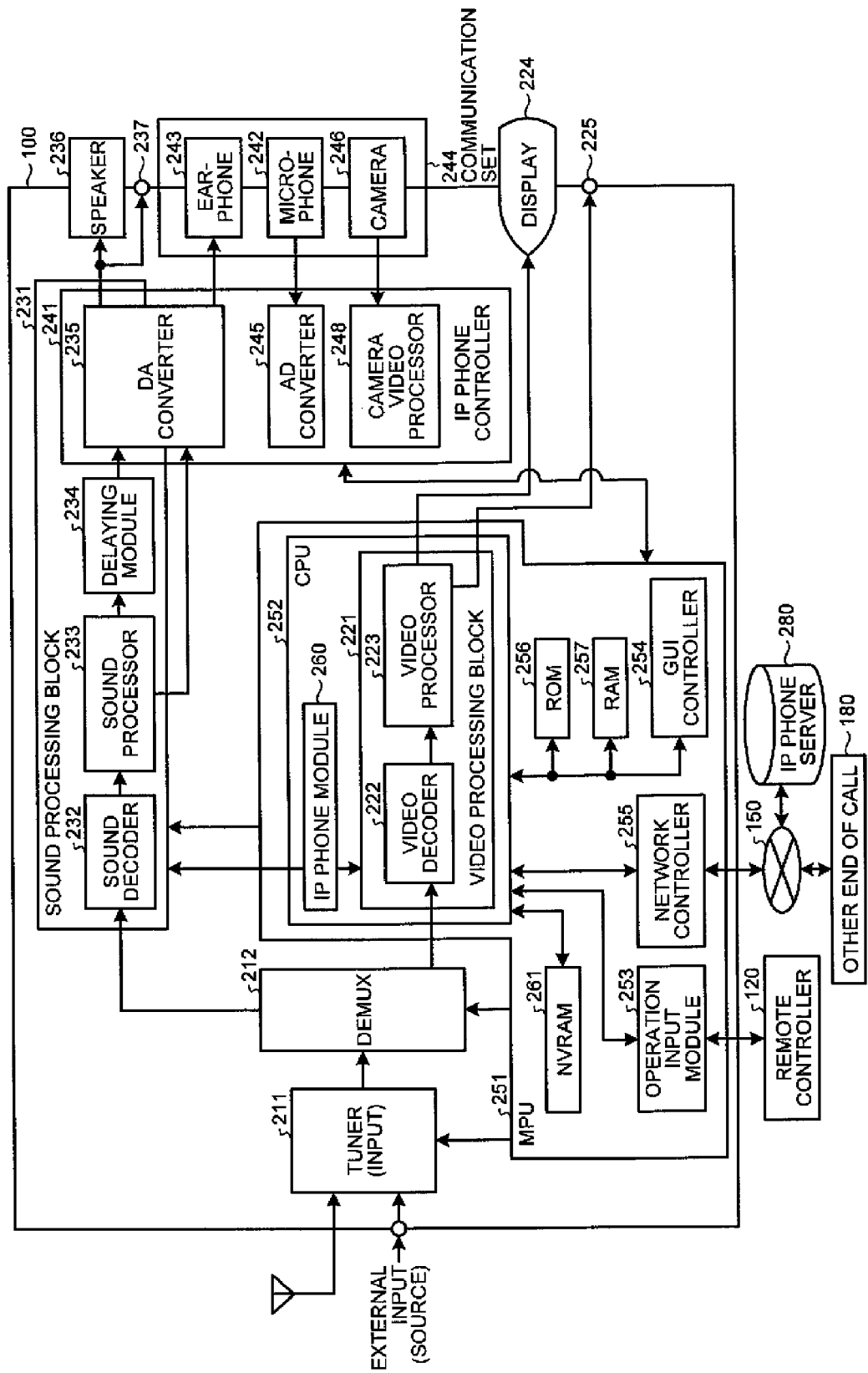
FIG. 2 is an exemplary block diagram of a video display apparatus and a communication apparatus incorporated therein, in the embodiment.

FIG. 2 is a block diagram of the video display apparatus and a communication apparatus incorporated therein according to the embodiment. Herein, the components, the configuration, and the functions described below can be put into practice either with hardware or with software using a microcomputer (a processor or a central processing unit (CPU)).

The video display apparatus 100 illustrated in FIG. 2 comprises a digital television receiver for receiving, for example, television broadcast and reproducing sound (audio) and video.

Herein, the video display apparatus 100 receives and reproduces at least programs (i.e., contents) of the digital broadcast. Further, the video display apparatus 100 is capable of receiving the contents provided via the network 150. Still further, the video display apparatus 100 can use the IP phone with sound (including audio) and moving images (video), with respect to any device connected thereto via the network 150 using the Internet protocol. The video display apparatus 100 is connected to an IP phone server 280 via the network 150.

In the video display apparatus 100, a tuner 211 functions as a broadcast data input module which receives broadcast contents (programs) containing first video data via an antenna or an external input terminal. A demultiplexer (demux) 212 demultiplexes the received broadcast contents into video data (first video data) and sound (audio) data.

In the video display apparatus 100, a video processing block 221 comprises a video decoder 222 and a video processor 223. The video decoder 222 decodes the video data demultiplexed by the demultiplexer 212, and outputs the decoded video data to the video processor 223.

The video processor 223 processes the decoded video data received from the video decoder 222 into a format displayable on a latter-stage display 224. In the embodiment, the video processor 223 converts the video data into data of a predetermined resolution, a predetermined frame rate, and a predetermined output mode such as the interlace (i)/non-interlace (p) mode, and then feeds the converted video data to the display 224. Herein, the output of the video processor 223 can also be fed to an output terminal 225 to which, for example, an external monitor or a projector is connectable.

Meanwhile, the sound (audio) data demultiplexed by the demultiplexer 212 is input to a sound (audio) processing block 231, which comprises a sound decoder 232, a sound processor 233, a delaying module 234, and a digital-to-analog (DA) converter 235.

The sound decoder 232 decodes the sound data input thereto, and outputs the decoded sound data to the sound processor 233.

Upon receipt of the sound data decoded by the sound decoder 232, the sound processor 233 processes the sound data so that the sound data becomes reproducible in an audio output device, and outputs it to the delaying module 234. The delaying module 234 delays an output of the received sound data (i.e., delays the sound (audio) output) by a predetermined time period so as to achieve time consistency with respect to the video data output by the video processor 223. The delayed sound data is then input to the DA convertor 235 for obtaining analog sound (audio) output.

The analog sound (audio) data output by the DA converter 235 is input to, for example, a speaker 236. Besides, the analog sound (audio) data output by the DA converter 235 can also be branched to an output terminal 237 to which an audio visual (AV) amplifier is connectable.

Meanwhile, the sound (audio) data delayed for the predetermined time period by the delaying module 234 can also be input to an IP phone controller 241. The IP phone controller 241 is connectable to a communication set 244 comprising a microphone 242, an earphone 243, and a camera 246. Herein, instead of the earphone 243, a low-output sound reproducing speaker can be used as a sound reproducing module. The camera 246 is installed to capture the user's face from the external environment.

The IP phone controller 241 comprises an analog-to-digital (AD) converter 245 and a camera video processor 248. The IP phone controller 241 shares the DA convertor 235 with the sound (audio) processing block 231. The AD converter 245 performs analog-to-digital conversion on the analog sound input from the microphone 242. The camera image processor processes the data input from the camera 246, and generates video data.

A main control block 251 controls each of the tuner 211, the demultiplexer 212, the sound (audio) processing block 231, and the IP phone controller 241 of the video display apparatus 100, and instructs those constituent elements to perform predetermined operations.

The main control block (MPU: main processing unit) 251 at least comprises a central processing unit (CPU) 252, a read only memory (ROM) 256, a random access memory (RAM) 257, a graphical user interface (GUI) controller 254, a network controller 255, and an operation input module 253.

The ROM 256 stores therein operation programs. The RAM 257 serves as a work area. The GUI controller 254 displays a GUI on the display 224 and processes the user input received via the GUI.

The CPU 252 is connected to a nonvolatile read only memory (NVRAM) 261, which is a nonvolatile and rewritable memory device serving as a memory for storing a variety of data under the control of the CPU 252.

The network controller 255 controls connection with the network 150, that is, controls obtaining a variety of information from the network 150 and controls the user access to the network 150. In the embodiment, the network controller 255 sends and receives data used in the communication between the video display system 1 and other communication devices.

The operation input module 253 comprises, for example: channel keys (buttons) for identifying the channels selected by the tuner (input module) 211; and a power ON/OFF switch used to switch ON or OFF the power. The operation input module 253 is connected to the MPU 251. The operation input module 253 receives instructions or control input from the remote controller 120. Moreover, a keypad (keyboard) that allows the input of alphabets, codes, and numeric characters may be connected to the operation input module 253.

The remote controller 120 comprises channel keys and a power ON/OFF switch, as well as comprises an operation key for the purpose of starting a call via the IP phone. At the time of performing an operation using that operation key, the operation input module 253 receives instructions based on the operation to be performed.

The CPU 252 reads the operation programs from the ROM 256, and performs control according to the operation programs while making use of the RAM 257 as the work area. The operation programs comprises: an operating system (OS); applications such as a television (TV) program application; various drivers; a video processing program; and an IP phone program (see FIG. 7).

The video processing program (described later in detail) realizes the video processing block 221 (i.e., the video decoder 222 and the video processor 223).

The IP phone program realizes an IP phone module 260, which is a data input module used for making videophone calls to or receiving videophone calls from the communication device 180 over the network 150. The IP phone program can be provided with functions of known computer programs. For example, the IP phone program can make use of "Skype" (registered trademark), which is the Internet phone software provided by Skype Technologies.

The IP phone module 260 packetizes the sound data representing the sound of a user caught by the microphone 242 of the communication set 244, and transmits the packets to the other end of communication via the network 150. Further, if the camera 246 captures the video of the user (second video data), then the IP phone module 260 packetizes the video, and transmits it with the sound data.

Besides, when information is received from the other end of communication via the network controller 255, the IP phone module 260 demultiplexes sound data and video data from the received information, and decodes the demultiplexed data. The decoded sound data is input to the sound (audio) processing block 231. The sound data processed by the sound processor 233 of the sound processing block 231 is then output to the DA converter 235. Consequently, the sound from the other end of communication is output through the speaker 236 or the earphone 243.

The decoded video data is input to the video processing block 221. The video processor 223 of the video processing block 221 is capable of reproducing, for example, still images as typified by Joint Photographic Experts Group (JPEG) images or moving images as typified by Moving Picture Experts Group-2 (MPEG-2) images or MPEG-4 (H.264-AVC) images. Thus, the video processor 223 performs processing not only at the time of reproducing the contents but also at the time of reproducing the video data.

Figure 3:
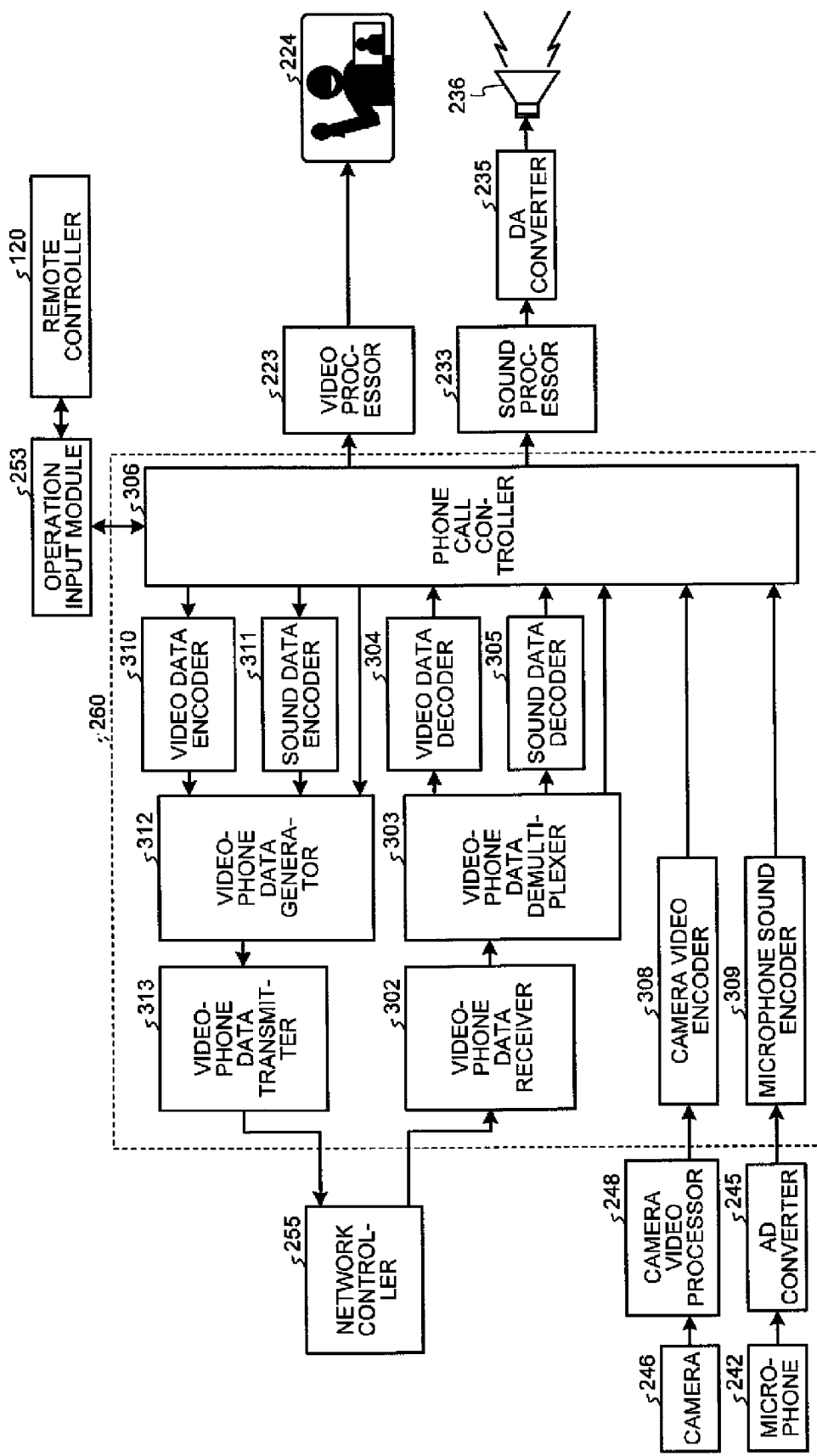
FIG. 3 is an exemplary block diagram of an IP phone module in the embodiment.

Explained below are the operations performed by the IP phone module 260. FIG. 3 is a block diagram of the IP phone module 260. As illustrated in FIG. 3, the IP phone module 260 comprises: a video data encoder 310; a sound data encoder 311; a videophone data generator 312; a video phone data transmitter 313; a videophone data receiver 302; a videophone data demultiplexer 303; a video data decoder 304; a sound data decoder 305; a phone call controller 306; a camera video encoder 308; and a microphone sound encoder 309.

With the abovementioned configuration, the video display apparatus 100 according to the embodiment realizes the videophone function.

In the embodiment, during a videophone call between the video display apparatus 100 and the communication device 180, videophone data is communicated between the video display apparatus 100 and the communication device 180.

Figure 4:
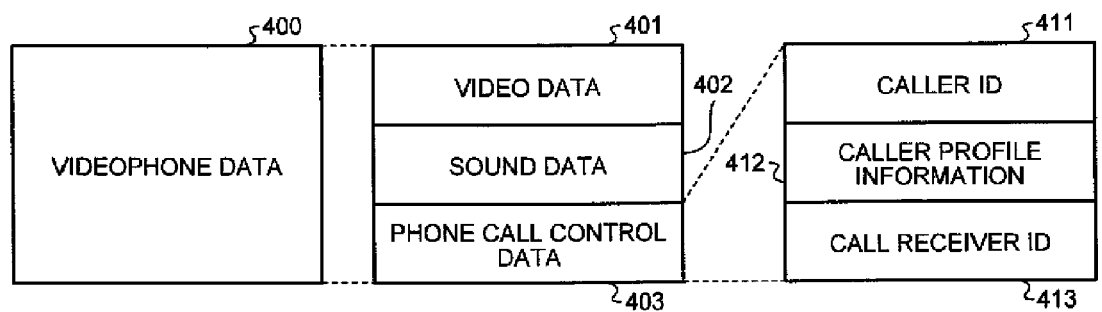
FIG. 4 is an exemplary diagram illustrating data configuration of videophone data in the embodiment.

FIG. 4 is a diagram illustrating data configuration of the videophone data. As illustrated in FIG. 4, videophone data 400 contains video data 401, sound data 402, and phone call control data 403. The video data 401 represents the encoded data of videos that are input from the camera 246. The sound data 402 represents the encoded data of sound that is input from the microphone 242.

The phone call control data 403 represents the data used for the control performed during a videophone call. In the embodiment, the phone call control data 403 contains a caller ID 411, caller profile information 412, and a call receiver ID 413.

The caller ID 411 and the call receiver ID 413 are assigned by the IP phone server 280 in such a way that there is no duplication of IDs assigned to the communication apparatuses (including the video display apparatus 100) that are connected to the videophone system or assigned to the users. The caller profile information 412 contains personal information such as the IP address of the caller, a device-specific address, and the name and address of the caller.

By transmitting/receiving the videophone data 400, it becomes possible to make phone calls among the communication apparatuses including the video display apparatus 100.

Returning to FIG. 3, during a phone call, the video display apparatus 100 sends via the network controller 255 the videophone data containing the video data captured by the camera 246 and the sound data captured by the microphone 242. Further, the video display apparatus 100 displays the video data demultiplexed from the videophone data received through the network controller 255 on the display 224, and output the sound data demultiplexed from the videophone data received through the network controller 255 to the speaker 236. Here, in the embodiment, the video data can be either moving image data or still image data.

Furthermore, in the video display apparatus 100, user instructions from the remote controller 120 are received via the operation input module 253, and the television function and the videophone function are controlled according to the instructions.

The camera video encoder 308 encodes the video data generated by the camera video processor 248, and obtains the video data captured by the camera 246.

The microphone sound encoder 309 encodes the digital sound data obtained by the AD converter 245, and obtains the sound data captured by the microphone 242.

The videophone data receiver 302 receives the videophone data, which is the necessary information for communication, from the communication device 180 via the network controller 255. Then, the received videophone data is output to the videophone data demultiplexer 303.

The videophone data demultiplexer 303 demultiplexes the videophone data received from the videophone data receiver 302 into the video data 401, the sound data 402, and the phone call control data 403. Herein, the phone call control data 403 is input directly to the phone call controller 306, without modification.

The video data decoder 304 decodes the demultiplexed video data 401, and outputs the decoded video data to the phone call controller 306. Similarly, the sound data decoder 305 decodes the demultiplexed sound data, and outputs the decoded sound data to the phone call controller 306.

The phone call controller 306 controls making videophone calls to and receiving videophone calls from the communication device 180. For example, when the phone call control data 403 demultiplexed by the videophone data demultiplexer 303 is received, the phone call controller 306 determines whether the call receiver ID 413 comprised in the phone call control data 403 matches with the ID used in identifying the video display apparatus 100. If the call receiver ID 413 matches with the ID used in identifying the video display apparatus 100, the phone call controller 306 allows receiving the incoming call.

Figure 5:
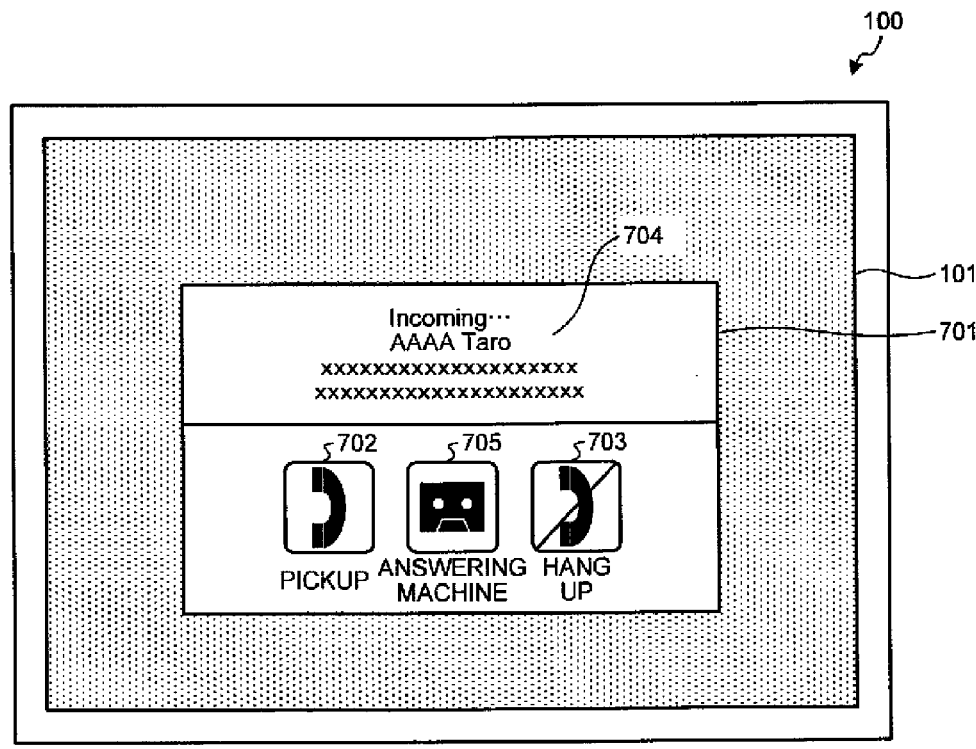
FIG. 5 is an exemplary diagram of an incoming call display screen displayed on a display, in the embodiment.

FIG. 5 illustrates an example of an incoming call display screen that is displayed on the display 224. As illustrated in FIG. 5, on the display screen 101, an incoming call notification window 701 is superimposed and displayed on the contents. The incoming call notification window 701 comprises a call pickup button 702 for picking up the incoming call, a call hang up button 703 for forcibly hanging up the incoming call, a profile information field 704 on which the profile of the caller is mentioned, and an answering machine button 705 for recording a message from the caller. The videophone call with the caller starts only when the user of the videophone selects the call pickup button 702.

Only when the user of the videophone selects the call pickup button 702, the phone call controller 306 starts controlling the phone call with the communication device 180 that is identified by the caller ID 411. Once the phone call starts being controlled, the phone call controller 306 outputs to the video processor 223 the sender's video data 401 that has been decoded by the video data decoder 304.

Furthermore, with respect to the sound data 402 that has been decoded by the sound data decoder 305, the phone call controller 306 performs correction such as noise cancelling and echo cancelling, and outputs the corrected sound data to the sound processor 233.

Figure 6:
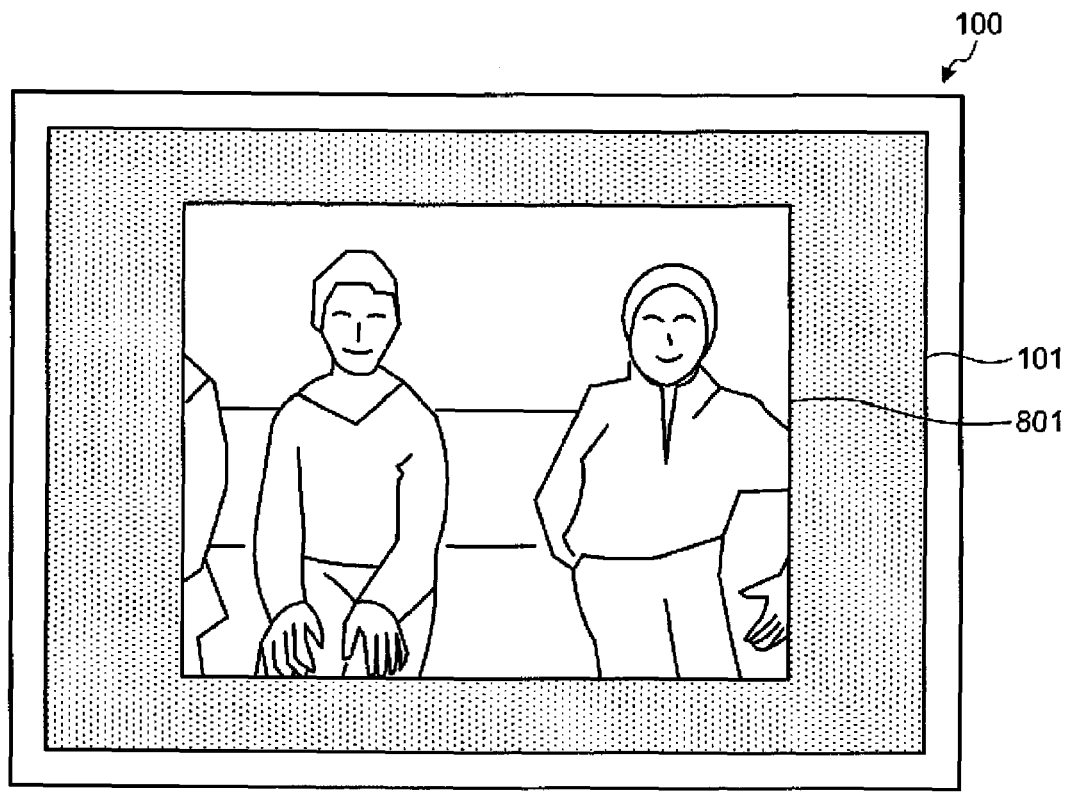
FIG. 6 is an exemplary diagram of a caller video display screen displayed on the display, in the embodiment.

Consequently, once the video processor 223 synthesizes the video data, the display 224 displays sender's video data 801 on the display 224 as illustrated in FIG. 6. Further, once the sound processor 233 synthesizes the sound data, the DA converter 235 converts the sound data into sound. Consequently, the sound from the sender's side is output from the speaker 236.

As described above, a screen for making/receiving a phone call by the IP function such as the "Skype" is not displayed if the broadcast reception or another application is being displayed in the video display apparatus 100. Further, when an incoming call is received while an application such as the television program has been executed, only a notification of the incoming call is displayed on the display screen 101. Consequently, the user has to close the running application such as the television program, start the IP phone program using the remote controller 120, and respond to the incoming call by running the IP phone function.

When the controlling of the phone call starts, the phone call controller 306 may superpose the sender's video data 401 decoded by the video data decoder 304 on the receiver's video data received from the camera video encoder 308, and outputs the superposed data to the video processor 223. In that case, the display 224 displays such video data containing the sender's video data and the receiver's video data.

Explained below is the video processing performed by the video processor 223 of the video display apparatus 100 according to the embodiment. Herein, FIG. 7 is a hierarchy diagram of a software configuration and FIG. 8 is a flowchart of the video processing.

Figure 7:
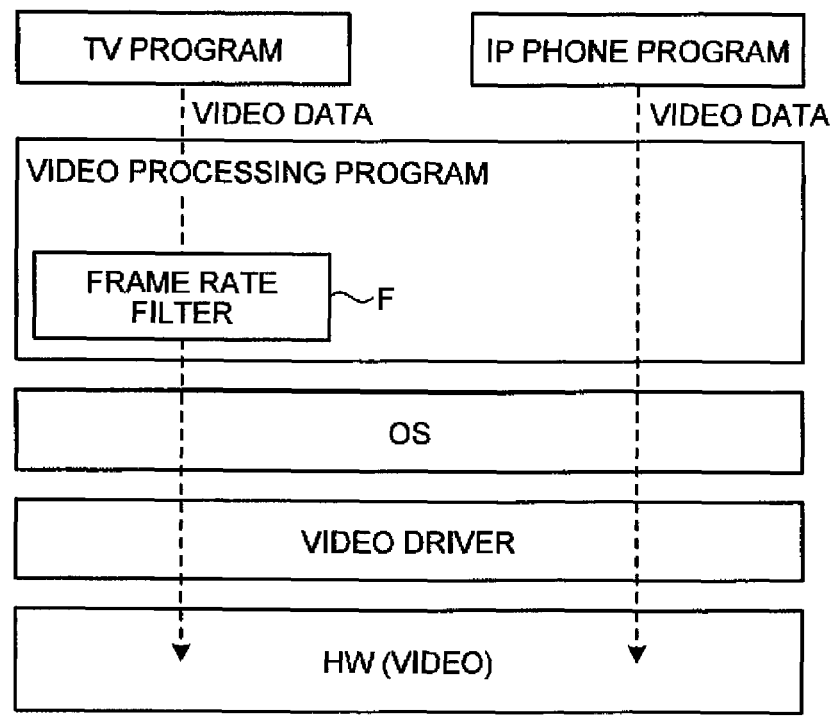
FIG. 7 is an exemplary hierarchy diagram of a software configuration in the embodiment.
Figure 8:
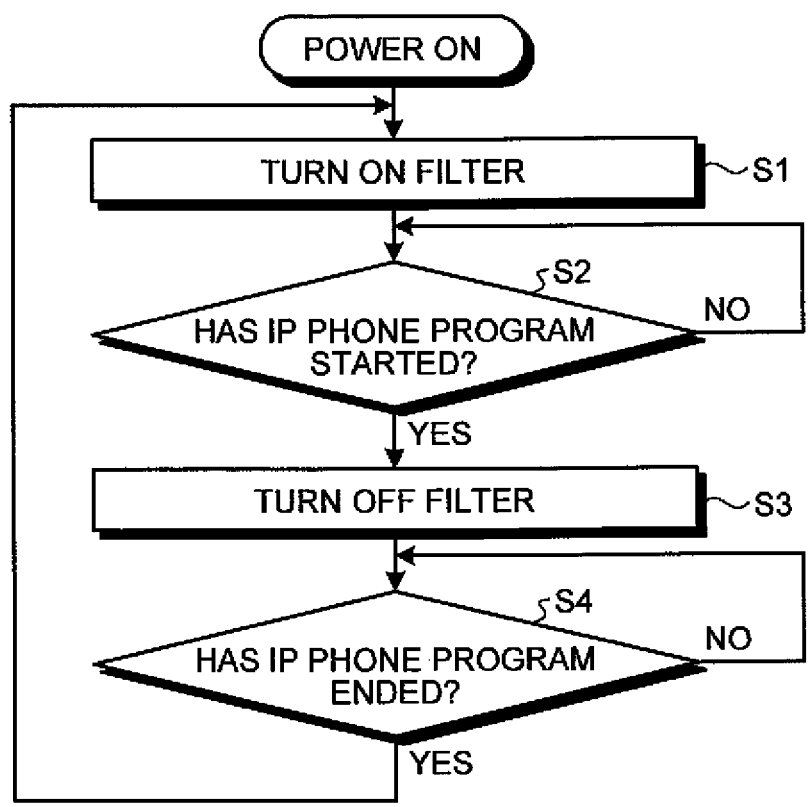
FIG. 8 is a flowchart of video processing in the embodiment.

As illustrated in FIG. 7, the video processing program is a middleware placed in between the OS and the application software (the television program and the IP phone program).

As illustrated in FIG. 7, the video processing program comprises a frame rate filter F that serves as a restricting module. Given below is the explanation of the frame rate filter F.

Regarding the terrestrial television colorcast, Japan and America employ the NTSC standard by the National Television System Committee. According to the NTSC standard, a single frame (single screen) is configured with 525 scan lines and is displayed at the frame rate of 30 fps. In contrast, China or European countries such as Germany, England, and Netherlands employ the Phase Alternating Line (PAL) standard, according to which a single frame (single screen) is configured with 625 scan lines and is displayed at the frame rate of 25 fps.

Typically, even if the broadcast waves have different frame rates such as that in the NTSC standard and the PAL standard, it is still possible to reproduce both contents. However, that causes various negative impacts. Therefore, in the video display apparatus 100, a frame rate (in fps) at which the reproduction of contents is restricted is specified in advance in the frame rate filter F illustrated in FIG. 7. Then, if the frame rate (in fps) of the received broadcast wave (i.e., frame rate (in fps) of the video data received from a television program) deviates from the specified frame rate, the reproduction of the contents is restricted. In the embodiment, the frame rate filter F is set to restrict the reproduction of contents at the frame rate of 25 fps (PAL standard).

In case of an IP phone program such as Skype, a frame rate is made selectable from a certain range (for example, from 5 fps, 10 fps, 15 fps, 20 fps, 25 fps, and 30 fps) according to the machine performance. Thus, although the frame rate (in fps) of the video data received from the IP phone program is set to 25 fps, the reproduction of contents should not be restricted by the frame rate filter F. Therefore, in the video display apparatus 100 according to the embodiment, the video data received from the IP phone program is exempted from the restriction applied by the frame rate filter F.

In the video display apparatus 100, the control is performed in such a way that the frame rate restriction by the frame rate filter F is disabled when the IP phone program such as the "Skype" is active, and the frame rate restriction by the frame rate filter F is reapplied when IP phone program is inactive. Accordingly, a single video display apparatus 100 becomes capable of handling both cases.

As illustrated in FIG. 8, when the video display apparatus 100 is switched ON, the video processor 223 turns ON the frame rate filter F (S1) and waits for the IP phone program to start (S2).

Once the IP phone program starts (Yes at S2), the video processor 223 turns OFF the frame rate filter F (S3), and waits for the IP phone program to end (S4).

Once the IP phone program ends (Yes at S4), the system control returns to S1 and the video processor 223 turns ON the frame rate filter F.

In this way, in the video display apparatus 100 according to the embodiment, when a value of a predetermined item in the first video data received from the tuner 211 deviates from a specified value set in advance in the frame rate filter F while the IP phone module 260 is inactive, reproduction of the first video data is restricted. On the other hand, when the IP phone module 260 is active, the restriction applied by the frame rate filter F is disabled. As a result, it becomes possible to maintain restricting the reproduction of the contents (first video data) received via the broadcast wave with different standard (such as different frame rate) as in the conventional technology, while the reproduction of the second video data generated during the use of an IP phone is not to be restricted by the frame rate filter F.

In the video display apparatus 100 according to the embodiment, the frame rate (in fps) at which the reproduction of contents is restricted is specified in advance in the frame rate filter F. Then, if the frame rate (in fps) of the received broadcast waves (i.e., frame rate (in fps) of video data received from a television program) deviates from the specified frame rate, reproduction of the contents is disabled. However, the restriction is not limited to be based on the frame rate. For example, it is also possible to specify in advance a sound bit rate, a video bit rate, an aspect ratio, a resolution, or a delaying time at which the reproduction of contents is restricted. In that case, if each item (the sound bit rate, the video bit rate, the aspect ratio, the resolution, or the delaying time) of the received broadcast waves (video data received from a television program) deviates from the specified value, the reproduction of the contents may be restricted.

The video processing program and the IP phone program executed in the video display apparatus 100 according to the embodiment are stored in advance in the ROM 256 or the like and provided.

Alternatively, the video processing program and the IP phone program executed in the video display apparatus 100 according to the embodiment can be provided in the form of installable or executable files on a computer-readable recording medium such as a compact disk read only memory (CD-ROM), a flexible disk (FD), a compact disk readable (CD-R), or a digital versatile disk (DVD).

Still alternatively, the video processing program and the IP phone program executed in the video display apparatus 100 according to the embodiment can be saved as downloadable files on a computer connected to a network such as the Internet or can be made available for distribution through the network. Still alternatively, the video processing program and the IP phone program executed in the video display apparatus 100 according to the embodiment can be distributed over a network such as the Internet.

The video processing program executed in the video display apparatus 100 according to the embodiment has a module configuration comprising each of the aforementioned modules (the video processor 223). In terms of the actual hardware, a CPU (processor) reads out the video processing program from the ROM and runs it so that the video processing program is loaded in a main memory device. As a result, the functions of the video processor 223 are implemented in the main memory device. Similarly, the IP phone program executed in the video display apparatus 100 according to the embodiment has a module configuration comprising each of the aforementioned modules (the IP phone module 260). In terms of the actual hardware, the CPU (processor) reads out the IP phone program from the ROM and runs it so that the IP phone program is loaded in the main memory device. As a result, the functions of the IP phone module 260 are implemented in the main memory device.

In the embodiment, the explanation is given for the case when the video display apparatus 100 is applied to a digital television receiver. However, the video display apparatus 100 can also be as applied to a hard disk drive (HDD) recorder, a tuner, a set-top box, or the like.

Moreover, in the embodiment, the video data output by the IP phone module 260 is assumed to be the second video data which is contained in information complying with a standard different from the standard of the broadcast contents communicated with the communication device 180, which is an information processor such as a personal computer or a digital television connected via the network 150. However, the explanation is also applicable to the video data of all network contents not related to the standard of the broadcast contents.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video display apparatus comprising:
   a broadcast data inputter configured to input broadcast contents comprising first video data;
   a data inputter configured to input information comprising second video data from an information processor connected via a network, the information complying with a standard different from a standard of the broadcast contents;
   a restricter configured to preliminarily set a first value related to video data; and
   a video processor configured to restrict reproduction of the first video data when the data inputter is inactive and a value of the first video data deviates from the first value, and configured to not restrict reproduction of the second video data when the data inputter is active.

2. The video display apparatus of claim 1, wherein the first value is a frame rate of video data.

3. The video display apparatus of claim 2, wherein the restricter is configured to restrict reproduction of the first video data when the frame rate of the first video data is 25 frames per second.

4. A video processing method implemented in a video display apparatus comprising:
   preliminarily setting a first value related to video data to restrict reproduction of first video data; and
   restricting reproduction of the first video data when a data inputter is inactive and a value of the first video data deviates from the first value, and not restricting reproduction of second video data when the data inputter is active.

5. The video processing method of claim 4, wherein the first value is a frame rate of video data.

6. The video processing method of claim 5, wherein reproduction of the first video data is restricted when the frame rate of the first video data is 25 frames per second.

7. A video display system comprising:
   a video display apparatus; and
   an information processor connected to the video display apparatus via a network, wherein
   the video display apparatus comprises:
      a broadcast data inputter configured to input broadcast contents comprising first video data;
      a data inputter configured to input information comprising second video data from the information processor, the information complying with a standard different from a standard of the broadcast contents;
      a restricter configured to preliminarily set a first value related to video data; and
      a video processor configured to restrict reproduction of the first video data when the data inputter is inactive and a value of the first video data deviates from the first value, and configured to not restrict reproduction of the second video data when the data inputter is active.

8. The video display system of claim 7, wherein the first value is a frame rate of video data.

9. The video display system of claim 8, wherein the restricter is configured to restrict reproduction of the first video data when the frame rate of the first video data is 25 frames per second.

* * * * *